United States Patent [19]
Kojima et al.

[11] Patent Number: 5,087,645
[45] Date of Patent: Feb. 11, 1992

[54] EMULSION TYPE WATER PAINT, PROCESS FOR ITS PRODUCTION, AND PROCESS FOR APPLYING SAME

[75] Inventors: Shunji Kojima, Yokosuka; Yoshiki Watanabe, Yokohama; Hiroaki Goto, Tokyo; Toshinori Moriga, Yokohama, all of Japan

[73] Assignee: Toyo Seikan Kaisha Ltd., Tokyo, Japan

[21] Appl. No.: 272,838

[22] PCT Filed: Jan. 27, 1988

[86] PCT No.: PCT/JP88/00064
§ 371 Date: Nov. 17, 1988
§ 102(e) Date: Nov. 17, 1988

[87] PCT Pub. No.: WO88/05455
PCT Pub. Date: Jul. 28, 1988

[30] Foreign Application Priority Data

Jan. 27, 1987 [JP] Japan .................. 62-15146
Jan. 27, 1987 [JP] Japan .................. 62-15147
Mar. 25, 1987 [JP] Japan .................. 62-69176
May 7, 1987 [JP] Japan .................. 62-109727

[51] Int. Cl.$^5$ .................. C08K 3/20; B32B 7/00
[52] U.S. Cl. .................. 523/406; 523/409; 523/412; 523/413; 427/248.1; 427/255.6; 427/348; 166/287.22

[58] Field of Search .......... 427/248.1, 255.6; 106/348, 287.22; 523/406, 413, 409, 412

[56] References Cited

U.S. PATENT DOCUMENTS 4,579,888  4/1986  Kodama et al. .................. 523/412

FOREIGN PATENT DOCUMENTS 44-18076   4/1969  Japan .
52-133342  8/1977  Japan .
57-149365  9/1982  Japan .
59-213718 12/1984  Japan .
60-215016 10/1985  Japan .

*Primary Examiner*—Kriellion Morgan
*Attorney, Agent, or Firm*—Sughrue, Mion, Zinn Macpeak & Seas

[57] ABSTRACT

An O/W water paint having excellent dispersibility and stability is prepared according to a phase conversion process comprising adding ammonia or an amine and water to a solution of an epoxy resin, a hardener resin, and an acrylic resin in an organic solvent or to a molten mixture of these resins to neutralize the acrylic resin. In view of adhesion of a coat to metal and workability, branched alkylamines or heterocyclic amines are suitable as the neutralizing amine. In applying this paint, steam optionally containing fine water droplets is preferably applied to a wet coat prior to drying.

17 Claims, 1 Drawing Sheet

FIG. 1

EMULSION TYPE WATER PAINT, PROCESS FOR ITS PRODUCTION, AND PROCESS FOR APPLYING SAME

TECHNOLOGICAL FIELD

This invention relates to an emulsified-type water-base paint and processes for its production. More specifically, this invention relates to a water-base paint which is produced by a phase inversion emulsifying method utilizing the surface-activating action of an acrylic resin incorporated in a paint resin solution, and to processes for its production. The invention also pertains to a method of coating with this paint.

PRIOR ART

In the production of cans for canning, it has been the previous practice to coat metallic blanks or cans themselves with various paints in order to prevent dissolving of metal in can contents or inhibit corrosion of the metal. In the case of not only deep drawn cans produced from an uncoated metallic blank but also drawn cans or three-piece cans produced from a coated metallic blank, various paints are spray-coated and baked on can bodies or can closures in order to repair injuries caused to the coated film in the can-making process or to form top coats.

A paint comprising a combination of an epoxy resin and a curing agent resin and a vinyl-type paint are excellent in regard to adhesion to a metallic substrate, corrosion resistance, flavor characteristics and film processability. These paints exhibit good performance when coated in the form of an organic solvent solution. However, the solvent is dissipated in the working environment during spray coating, and problems of air pollution and environmental hygiene arise.

To eliminate these defects, water-base paints, namely paints in the form of an aqueous dispersion, have already been developed. A first type of such water-base paints comprises a paint resin rendered particulate by some means and dispersed in water using a surface-active agent or a water-soluble or hydrophilic resin as a dispersing agent (for example, Japanese Patent Publication No. 18076/1969). A second type is a paint obtained by reacting a paint resin having a functional group such as an epoxy resin with a resin having carboxyl groups such as an acrylic resin and neutralizing the modified resin with ammonia or an amine and causing it to self-emulsify in an aqueous medium (for example, Japanese Laid-Open Patent Publication No. 213718/1984).

However, the former type of water-base paint contains dispersed particles of the paint resin which generally tend to be large and non-uniform. Moreover, the water-base paint has low dispersion stability, and the properties of a coated film prepared from it is inferior to those of a film obtained from a solvent-base paint.

The later type of paint may have better dispersibility than the former type paint, but is greatly restricted in the composition of the paint resin. For example, in the case of an epoxy resin-type paint, it is difficult to secure a sufficiently high content of the resin curing agent, and the coated film cannot be fully cured. Consequently, the hardness and denseness of the coated film and its barrier property with respect to corrosive components cannot be improved to a satisfactory level.

Many coating methods have previously been proposed for forming good paint films using the above water-base paints.

For example, Japanese Laid-Open Patent Publication No. 133342/1977 describes that a slurry-like paint is coated on an article, and until the coated film is subjected to drying under heating, it is maintained in an atmosphere having a temperature of not more than 100° C. at which, in addition, the resin particles do not melt, a relative humidity of at least 80%, and an air speed of not more than 0.3 m/sec thereby to prevent cracking during film formation.

PROBLEM SOUGHT TO BE SOLVED BY THE INVENTION

When a water-base paint containing emulsified resin particles is coated on the surface of a metallic substrate by such means as a roll coater, raised and depressed patterns such as ribs occur on the coated surface and remain there after drying and baking. Accordingly, the coated surface loses smoothness.

In the case of a paint in the form of an organic solvent solution, the resin solution has flowability and levelling of the wet coated film occurs during the time from coating to baking (generally called the period of setting). In the case of a dispersion-type water-base paint, such levelling is difficult presumably because the paint resin is present in the form of dispersed particles, the dispersing medium is water having a high surface tension and a high viscosity and evaporation of water proceeds considerably rapidly on the surface.

In a coating method using a dispersion-type water-base paint, no effective means has yet been known for alleviating raised and depressed patterns such as ribs occurring during coating and improving the levelness of the coated film.

SUMMARY OF THE INVENTION

It is an object of this invention, therefore, to provide a water-base paint free from the above problems of a prior art water-base paint, and a novel process for its production.

Another object of this invention is to provide a water-base paint produced by a phase inversion emulsifying method applicable to a paint resin solution of any composition by utilizing the surface-activating action of an acrylic resin incorporated in the paint resin, and to a process for production thereof.

Still another object of this invention is to provide a water-base paint which has excellent dispersion stability and in which the resin component is controlled to a fine and uniform dispersed particle diameter, and a process for production thereof.

Yet another object of this invention is to provide a method of forming a coated film having excellent levelling property and appearance by removing raised and depressed patterns such as ribs formed on the surface of a wet coated film during coating of a dispersion-type water-base paint before the drying or backing of the coated film.

According to this invention, there is provided an emulsified-type water-base paint comprising a thermosetting resin, as a film-forming component, containing an epoxy resin component and a curing agent resin component therefor, and a carboxyl-containing acrylic resin as a polymeric dispersing agent, wherein the carboxyl groups in the acrylic resin are present in the form of an ammonium or amine salt in an amount corresponding to an acid value of 2 to 30 based on the paint resin component, and at least the thermosetting resin is present in the form of an o/w emulsion.

According to this invention, there is also provided a water-base paint for cans comprising a thermosetting resin, as a film-forming component, containing an epoxy resin component and a curing agent resin component therefor, and a carboxyl-containing acrylic resin as a polymeric dispersing agent, wherein the carboxyl groups in the acrylic resin are present in the form of a salt with at least one amine selected from the group consisting of alkylamines having a branched alkyl group and heterocyclic amines in an amount corresponding to an acid value of 2 to 30 based on the paint resin component, and at least the thermosetting resin is present in the form of an o/w emulsion.

According to another embodiment of the invention, there is provided a process for producing an emulsified-type water-base paint, which comprises preparing an organic solvent solution containing a paint resin and 3 to 30% by weight, based on the paint resin, of an acrylic resin having an acid value of 35 to 350, mixing the solution with ammonia or an amine and water to convert the carboxyl groups in the acrylic resin to an ammonium or amine salt, and allowing the resin component in the solution to self-emulsify to an o/w-type emulsion.

According to still another embodiment of the invention, there is provided a process for producing an emulsified-type water-base paint, which comprises melting a composition containing a paint resin and 3 to 30% by weight, based on the paint resin, of an acrylic resin having an acid value of 35 to 350 and optionally an organic solvent, mixing ammonia or an amine and water with the molten composition, kneading the mixture to convert the carboxyl groups in the acrylic resin to an ammonium or amine salt, and allowing the resin component to self-emulsify to an o/w-type emulsion.

According to this invention, there is further provided a method of coating with a water-base paint, which comprises coating a water-base paint containing emulsified resin particles on the surface of a metallic substrate, and prior to drying or baking of the resulting wet coated film, contacting the surface of the wet coated film with a water vapor or a water-vapor containing condensed fine water droplets to fluidize the resin particles on the surface of the wet coated film and levelling the surface of the coated film.

In the coating method of this invention, it is desirable to maintain the wet coated film at a temperature of at least 50° C. but lower than 100° C. during contact with the water vapor. For this purpose, the water vapor at high temperatures is sprayed against the surface of the wet coated film so that the temperature of the film becomes at least 50° C. but lower than 100° C.

In a further embodiment of this invention, in order to fluidize the resin particles, the metal substrate is heated by high frequency induction while the surface of the wet coated film is kept in contact with the water vapor. This heating makes it possible to maintain the temperature of the coated film at least 50° C. but lower than 100° C.

PREFERRED EMBODIMENTS OF THE INVENTION

In the present invention, the paint resin and the carboxyl-containing acrylic resin are mixed intimately on a molecular level to form a composition. For this purpose, an organic solvent solution, or a molten mixture, containing the paint resin and the carboxyl-containing acrylic resin is prepared. It is important at this time to adjust the acid value of the acrylic resin to 35 to 350, especially 70 to 330, and use the acrylic resin in an amount of 3 to 30% by weight, especially 5 to 25% by weight, based on the paint resin.

If the acid value of the acrylic resin is lower than the above-described limit, it is difficult to emulsify the paint resin component into fine and uniform o/w (oil-in-water) type dispersed resins in a neutralization step and a phase inversion emulsification step to be described, and the emulsion stability of the dispersed particles tend to be lowered. If the acid value of the acrylic resin is higher than the specified limit, the acrylic resin tends to separate from the paint resin component and migrate to the aqueous phase in the subsequent steps. For this reason, the paint resin is difficult to emulsify into a fine and uniform particle size, and the stability of the dispersion is rather reduced. Furthermore, the resulting coated film is prone to become sensitive to humidity. According to this invention, by selecting the acid value of the acrylic resin within the above-specified range, it is possible to emulsify the paint resin component into a uniform and fine size and improve the dispersion stability of the emulsified resin, and the resulting coated film can have excellent moisture resistance and water resistance.

If the amount of the acrylic resin incorporated is smaller than the above-specified limit, sufficient carboxylate salt groups cannot be formed in the interface between the aqueous phase and the oil phase (resin phase) in the neutralization step and the phase inversion step. Consequently, the paint resin component is difficult to emulsify into a uniform and fine particle size, and the dispersion stability of the aqueous dispersion is reduced. On the other hand, if the amount of the acrylic resin is larger than the above-specified limit, the inclusion of a large amount of the acrylic resin in the paint resin component affects the properties of the resulting coated film. Accordingly, the amount of the acrylic resin should be confined within the above-specified range.

According to this invention, the organic solvent solution or the molten mixture of the paint resin and the acrylic resin is converted to an oil-in-water (o/w)-type emulsion. In the dispersed resin particles in the o/w-type emulsion, the paint resin and the acrylic resin are in the blended or mutually dissolved state. It is presumed that the ammonium salt or amine salt groups of carboxylic acid formed in the acrylic resin are directed to the surface of the dispersed resin particles, namely to the interface between the resin and water.

Such an emulsion is prepared by a phase inversion method which comprises mixing or kneading the organic solvent solution or the molten mixture containing the paint resin and the acrylic resin with ammonia or an amine and water to convert the carboxyl groups in the acrylic resin into an ammonium or amine salt and allowing the resin component in the solution to self-emulsify into an o/w-type emulsion. In this case, ammonia or the amine may be fed into the system separately from water. Generally, however, it is advisable to feed them together with water in the form of an aqueous solution of ammonia or the amine.

In a first embodiment of this invention, if the organic solvent in the solution used is a water-miscible organic solvent, the solvent migrates to the aqueous phase as a dispersion medium. If the organic solvent in the solution is a water-immiscible organic solvent, this solvent exists as contained in the resin component which is a dispersed phase. The organic solvent in the dispersed phase can be easily removed by known methods to be described.

Figure 1:
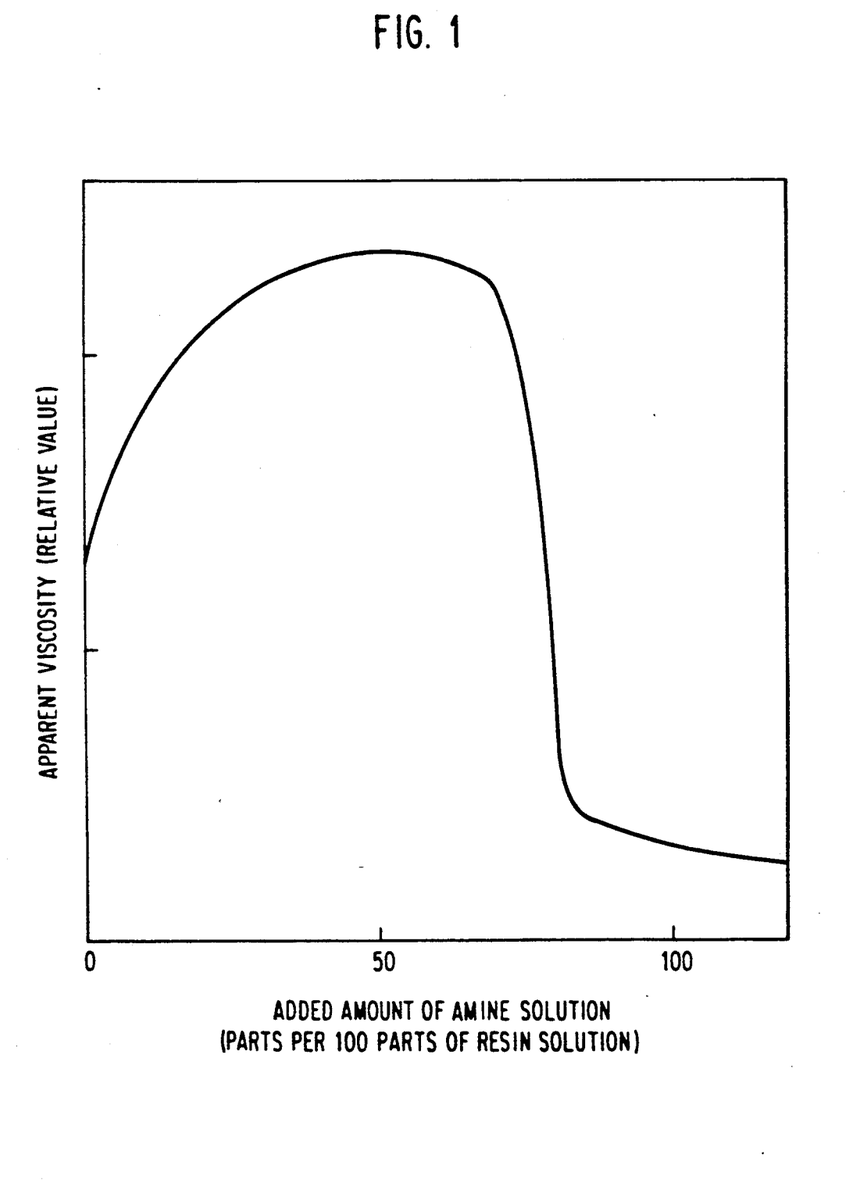
FIG. 1 shows the relative values of the apparent viscosity versus the amount of an aqueous solution of an amine per 100 parts of the resin solution.

When an aqueous solution of ammonia or the amine is added to the organic solvent solution containing the paint resin and the acrylic resin, the viscosity of the solution rises in the initial stage of the addition as shown in the attached FIG. 1. As the addition is continued, the viscosity of the system gradually decreases. If the addition is suspended at this stage and the entire system is homogenized by stirring and the addition of the aqueous ammonium or amine solution is again continued, the viscosity of the system abruptly decreases. In the early stage when the aqueous ammonia or amine solution is added to the resin solution, the aqueous phase exists in the form of a dispersed phase, but in the stage where the viscosity of the system abruptly decreases, an o/w-type emulsion in which the aqueous phase is a continuous (dispersion medium) phase and the resin component is a dispersed phase forms stably. The present invention is based on the finding that by the method of phase inversion emulsification of the solution containing the paint resin and the acrylic resin, a self-emulsifiable water-base paint having a fine and uniform dispersed resin particle diameter and excellent dispersion stability can be obtained. Of course, the addition of the aqueous ammonia or amine solution may be stopped at the stage where the viscosity of the system decreases abruptly. Alternatively, the aqueous ammonia or amine solution may be further added to homogenize the entire system and dilute it to a predetermined concentration.

In another embodiment of the invention, when kneading is continued while adding the aqueous ammonia or amine solution to the molten mixture of the paint resin and the acrylic resin, the resin melt exists as a continuous phase and the aqueous phase as a dispersed phase in the early stage of addition or kneading. As the amount of water added increases or the kneading is continued, phase inversion to an o/w-type emulsion in which the resin melt is a dispersed particle phase and water is a continuous phase occurs. It has been found surprisingly that this phase inversion occurs even by the addition of water in an amount of as small as 10% by weight based on the resin component. Phase inversion to the o/w-type emulsion by addition of such a small amount of water has been made possible for the first time by the process of this invention in which the molten mixture of the paint resin and the acrylic resin is used and the aqueous ammonia or amine solution is incorporated under melt-kneading. This is a novel feature not at all observed in the prior art.

This is presumably because the addition of the aqueous ammonia or amine solution to the resin melt forms ammonium or amine salts of the carboxyl groups of the acrylic resin on the interface between the resin melt and the aqueous phase; under the melt-kneading conditions, the surface tension of water is considerably reduced and the shearing force at the time of kneading stretches water into the form of a thin layer; and the resin melt is reduced to fine particles by its surface tension while the aforesaid ammonium or amine salt groups exist on the interface side.

When the melt of the paint resin-acrylic resin has a high melting or softening point or a high melt viscosity, an organic solvent may be incorporated at the time of melting the resin in order to reduce its melting or softening point and its melt viscosity. It should be understood however that in this case, the amount of the solvent may be less than that used in ordinary solutions because it is used for the aforesaid purpose; and that phase inversion to an aqueous dispersion takes place by adding a smaller amount of water than in the case of using a resin solution as a starting material. Thus, according to this invention, a self-emulsifiable water-base paint which has excellent dispersion stability and in which the dispersed resin particles have a fine and uniform size can be obtained by the phase inversion emulsification of the melt of the resins. Of course, the addition of the aqueous solution of ammonia or amine may be terminated at a stage where phase inversion occurs, or the aqueous solution of ammonia or amine may further be added to homogenize the entire system and dilute it to a predetermined concentration.

The acrylic resin used in this invention may be any acrylic resin which has an acid value within the aforesaid range. The acrylic resin is composed of a copolymer of an ethylenically unsaturated carboxylic acid or its anhydride which gives carboxyl groups of the aforesaid acid value to the resin and an acrylic or methacrylic ester and as desired, another ethylenically unsaturated monomer copolymerized with these monomers. Examples of the ethylenically unsaturated carboxylic acid or its anhydride include acrylic acid, methacrylic acid, crotonic acid, maleic acid, phthalic acid, itaconic acid, citraconic acid, maleic anhydride and itaconic anhydride.

Examples of the acrylic or methacrylic ester include methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate and n-octyl (meth)acrylate. The (meth)acrylate represents an acrylate and a methacrylate.

The other comonomer to be copolymerized with these monomers may be, for example, styrene, vinyltoluene, acrylonitrile, or methacrylonitrile.

The acrylic resin should have a molecular weight sufficient for film formation. Desirably, it has a molecular weight of generally 10,000 to 200,000, especially 20,000 to 150,000.

Example of suitable monomer combinations of the acrylic copolymer are (1) methyl methacrylate/2-ethylhexyl acrylate/acrylic acid, (2) styrene/methyl methacrylate/ethyl acrylate/methacrylic acid, (3) styrene/ethyl acrylate/methacrylic acid, and (4) methyl methacrylate/ethyl acrylate/acrylic acid.

These acrylic resins can be easily obtained by polymerizing these monomers in an organic solvent in the presence of an azobisisobutyronitrile or a peroxide.

On the other hand, the paint resin that can be used may be at least one thermosetting resin or thermoplastic resin which is soluble in an organic solvent. Examples include a phenol-formaldehyde resin, a furaneformaldehyde resin, a xylene-formaldehyde resin, a ketone-formaldehyde resin, a urea formaldehyde resin, a melamine-formaldehyde resin, an alkyd resin, an unsaturated polyester resin, an epoxy resin, a bismaleimide resin, a triallylcyanurate resin, a thermosetting acrylic resin, a silicone resin, an oily resin, a vinyl chloride/vinyl acetate copolymer, a partially saponified vinyl chloride/vinyl acetate copolymer, a vinyl chloride/maleic acid copolymer, a vinyl chloride/maleic acid/vinyl acetate copolymer, an acrylic polymer, and a saturated polyester resin. These resins may be used singly or in combination as the paint resin.

A combination of an epoxy resin and a curing agent resin for the epoxy resin may be cited as an example of a paint resin especially suitable for can making. A suitable epoxy resin is a bisphenol-type epoxy resin obtained by polycondensation of a bisphenol such as bisphenol A with an epihalohydrin. Preferably, this epoxy resin has an epoxy equivalent of generally 400 to 20,000, especially 1,000 to 5,000, and a number average molecular weight of generally 1,000 to 20,000, especially 2,000 to 13,000.

The resin curing agent reactive with the epoxy resin is a resin having a functional group reactive with the hydroxyl group or oxirane ring of the epoxy resin, such as a hydroxyl, amino or carboxyl group. Examples are resol-type and/or novolak-type phenol/formaldehyde resins, urea/formaldehyde resins, melamine/formaldehyde resins, alkyd resins, polyester resins, acrylic resins, polyurethane resins, xylene resins, epoxy ester resins and butyral resins. They may be used singly or in combination. Thermosetting resins containing a methylol group, particularly resol-type phenolic resins, are preferred among them. A marked characteristic feature of the present invention is that even when the composition ratio between the epoxy resin and the curing agent resin is any desired value, the paint resin can be dispersed and emulsified in resin particles with a fine particle diameter. Generally, the ratio of the epoxy resin to the curing agent resin is from 95:5 to 40:60, especially from 90:10 to 50:50.

According to this invention, paint resins generally called solvent-base vinyl paints or organosol-type vinyl paints can also be converted to emulsion-type water-base paints.

The solvent-base vinyl paints generally use a combination of (A) a vinyl chloride copolymer which is solvent-soluble and has carboxyl or hydroxyl groups and (B) a thermosetting resin.

Preferably, the solvent-soluble vinyl chloride copolymer (A) contains carboxyl and/or hydroxyl groups in a concentration of 5 to 500 millimoles/100 g of resin, particularly 10 to 300 millimoles/100 g of resin. Suitable examples include a partially saponified vinyl chloride/vinyl acetate copolymer, a vinyl chloride/vinyl acetate/acrylic acid copolymer, a partially saponified and partially butyralized vinyl chloride/vinyl acetate copolymer, a vinyl chloride/vinyl acetate/methacrylic acid copolymer, a vinyl chloride/vinyl acetate/maleic anhydride, a vinyl chloride/vinyl acetate/hydroxyethyl acrylate copolymer and a partially saponified vinyl chloride/vinyl acetate/acrylic acid copolymer. Preferred examples of the thermosetting resin (B) are those exemplified as the epoxy resin or the curing agent resin therefor. The weight ratio of the vinyl chloride copolymer (A) to the thermosetting resin (B) is from 99:1 to 50:50, especially from 95:5 to 60:40.

The organosol-type paints result from dispersing of vinyl chloride-type resin particles (C) in an organic solvent solution of the components (A) and (B) above. The vinyl chloride resin particles (C) used are produced by emulsion polymerization or suspension polymerization of vinyl chloride alone or with a combination of vinyl chloride with a small amount of another vinyl monomer such as butadiene, styrene or vinyl acetate, and have a particle diameter of generally 0.01 to 10 microns, particularly 0.02 to 5 microns. Paints of this type preferably contain 5 to 50% by weight of (A), 1 to 20% by weight of (B) and 5 to 50% by weight of (C), based on the resin solids.

In carrying out the process of this invention, (I) an organic solvent solution of the paint resin and (II) an organic solvent solution of the acrylic resin are prepared, and the solutions (I) and (II) are intimately mixed to form a starting solution. The organic solvent for this solution may be one or more solvents selected from, for example, aromatic hydrocarbon solvents such as toluene and xylene, ketone solvents such as acetone, methyl ethyl ketone, methyl isobutyl ketone and cyclohexanone, alcohol solvents such as ethanol, propanol and butanol, Cellosolve-type solvents such as ethyl Cellosolve and butyl Cellosolve, and ester solvents such as ethyl acetate and butyl acetate. The concentration of the resin component in the starting solution is suitably 5 to 80% by weight in general, especially 20 to 70% by weight. As desired, a known paint additive such as a plasticizer, lubricant, a pigment, a filler or a stabilizer may be incorporated in the starting solution.

Examples of the amines used for neutralization include alkylamines such as trimethylamine, triethylamine and butylamine, alcoholamines such as 2-dimethylaminoethanol, diethanolamine, triethanolamine, aminomethylpropanol and dimethylaminomethylpropanol, and morpholines. Polyamines such as ethylenediamine and diethylenetriamine may also be used. The ammonia and amine may preferably be used in an amount of at least 0.3 chemical equivalent, especially 0.7 to 1.3 chemical equivalents, based on the carboxyl groups of the acrylic resin. Generally, the use of water in an amount 0.5 to 2.0 times, especially 0.7 to 1.5 times, the weight of the starting solution is recommended for phase inversion although it varies depending upon the type of the resin and the concentration of the starting solution. It is sufficient that the resin solution and the aqueous solution of ammonia or the amine are mixed at room temperature. If desired, the mixing may be carried out at an elevated temperature of up to about 100° C. The addition and mixing may be carried out in a reaction vessel equipped with an ordinary stirrer. If desired, a high shear stirring device such as a homomixer may be used, or ultrasonic irradiation may be used.

As a result of phase inversion, the aqueous dispersion contains both water and the organic solvent. The organic solvent may be removed as an azeotrope with water, or the aqueous dispersion may be concentrated, by subjecting the aqueous dispersion to azeotropic distillation under reduced pressure. It should be understood that azeotropic distillation of the organic solvent may be carried out while supplying water from outside.

In a second embodiment of this invention, a melt containing the paint resin and the acrylic resin is prepared. The suitable melt viscosity of this melt is generally 10 to 100,000 centipoises, especially 100 to 30,000 centipoises. If its melt viscosity is higher than the specified limit, intimate and uniform kneading of both may sometimes become difficult. The suitable temperature of the melt is 10° to 150° C., especially 20° to 120° C. If the temperature is higher than the specified limit, partial gellation or premature gellation tends to occur undesirably in the paint resin component. An organic solvent may be used for the purpose of lowering the kneading temperature and the melt viscosity of the mixture. The organic solvent used at this time may be, for example, one or more of aromatic hydrocarbon solvents such as toluene and xylene, ketone solvents such as acetone, methyl ethyl ketone, methyl isobutyl ketone and cyclohexanone, alcohol solvents such as ethanol, propanol and butanol, Cellosolve solvents such as ethyl Cellosolve and butyl Cellosolve, and ester solvents such as ethyl acetate and butyl acetate. The suitable amount of the organic solvent is not more than 30% by weight, particularly not more than 15% by weight, based on the resin components. Of course, one or both of the resin components may be submitted to the kneading in the form of an organic solvent solution.

The melt-kneading may be carried out by using a kneader, a Banbury mixer, or a single-screw or twin-screw extruder-type kneading device. In the kneading, known additives may be added to the melt. The type of the amine used for neutralization and the amounts of ammonia, amine and water are the same as in the case of the solution phase inversion method.

The aqueous solution of ammonia or the amine is carried out in the melt-kneading device mentioned above. Of course, the melt-kneading after addition of water may be carried out in a device separate from the device for kneading the resins.

When the organic solvent is used in combination, the aqueous dispersion formed as a result of phase inversion contains both water and the organic solvent. By subjecting this aqueous dispersion to azeotropic distillation under reduced pressure, the organic solvent may be removed as an azeotrope with water or the aqueous dispersion may be concentrated. It should be understood that the azeotropic distillation of the organic solvent may be carried out while water was supplied from outside.

According to a preferred embodiment of this invention, the carboxyl groups of the acrylic resin are neutralized with at least one amine selected from the group consisting of alkylamines having a branched alkyl group and heterocyclic amines.

A water-base paint for cans containing an acrylic resin having carboxyl groups in the form of an amine salt as a dispersing agent tends to have poor adhesion to a metallic substrate or poor film processability. The reason for this is considered to be that the amine shows a high curing speed with respect to the epoxy resin.

Generally, curing of an epoxy resin is effected in two types, one being the curing by ring-opening of the terminal epoxy groups and the other being curing by the reaction of the hydroxyl groups in the molecular chain. The curing of the epoxy resin with the amine is by ring-opening mentioned in the first place. It is presumed that since with dimethylaminoethanol, etc. used most widely for neutralization of the carboxyl group in the prior art, curing of the epoxy resin with the amine takes place prior to the inherent curing by the reaction of the epoxy resin with the curing agent resin therefor, adhesion and processability cannot be obtained as expected.

In contrast, the alkylamines having a branched alkyl group and the heterocyclic amines used in this invention have a low speed of curing the epoxy resin. Hence, curing of the coated film by the reaction of the epoxy resin component and the curing agent resin component takes place selectively, and adhesion and processability can be obtained as expected.

The reason for this has not yet been made clear. It is presumed however that the amines used in this invention have a slow rate of curing epoxy resins by their steric hindrance effect, for example, although the differences in the rate of curing reaction of the epoxy resin with the types of the amines have not yet been fully elucidated.

The amines having a branched alkyl group such as isopropylamine, sec-butylamine, tert-butylamine and isoamylamine may be an alkylamine having a branched alkyl group with 3 to 6 carbon atoms, particularly 3 to 4 carbon atoms.

The heterocyclic amine may be a saturated heterocyclic amine having one nitrogen atom, such as pyrrolidine, piperidine or morpholine.

The paint resin solids concentration in the final water-base paint is desirably 10 to 70% by weight, particularly 20 to 60% by weight, and the content of the organic solvent in the water-base paint is desirably not more than 15% by weight, especially not more than 5% by weight. It is permissible to add some amount of a surface active agent or a polymeric dispersant to the system at any desired stage in order to increase the dispersion stability of the resin components in the paint.

The water-base paint in accordance with this invention may be coated on various metallic blanks, can bodies, can closures or other members in a viscosity suitable for coating. The water-base paint may be used not only in ordinary spray coating or electrostatic coating but also in coating operations with various coaters such as roller coating, brush coating, doctor coating, air knife coating and reverse coater coating.

The coating method in accordance with this invention is based on the finding that to remove raised and depressed patterns such as ribs which occur during coating of a metallic substrate with an emulsified and dispersed-type water-base paint and level the coated surface, it is important not only to avoid drying of the surface of the wet coated film but also to contact the surface with a water vapor or a water vapor containing condensed fine water droplets thereby fluidizing the resin particles on the surface.

The extent to which the resin particles on a surface coated with the dispersed water-base paint can flow depends upon the amount of the water as a medium present around the resin particles, the viscosity of the water medium, and the degree of the surface tension of the medium water.

On the surface coated with the water-base paint, the water as a medium is in a very easily evaporable condition. Water evaporates from the surface of the coated film to cause aggregation or coalescing of the resin particles to one another. As a result, it is extremely difficult to cause the resin particles on the coated surface to flow.

In the coating method of this invention, when the surface of the wet coated film is contacted with a water vapor or a water vapor containing fine aggregated water droplets (steam will correspond to it), a minute amount of water is supplied among aggregated particles or among particles tending to aggregate, and the latent heat incident to the condensation of vapor is released onto the surface layer. Consequently, the viscosity and surface tension of the water as a medium are reduced, and the resin particles on the surface of the coated film easily flow to remove raised and depressed patterns such as ribs existing on the surface of the coated film. The levelness of the surface of the coated film is thus enhanced.

In the present invention, it is most preferred to contact the coated surface with the steam and thus to perform levelling treatment of the coated film. This is because the steam contains very fine-sized water droplets in addition to water vapor, and therefore by contacting for a comparatively short period of time, water can be supplied in an amount sufficient for fluidization to the surface of the coated film.

If in this case, heating is carried out so that the temperature of the coated film is at least 50° C. but lower than 100° C., the levelness of the coated film is further improved. If the temperature of the entire coated film is at least 50° C., the flowability of the resin particles increases further as compared with the case wherein the entire coated film is at room temperature. On the other hand, if the temperature of the coated film reaches 100° C. or higher, the film boils and defects such as foaming occur in the coated film. Desirably, the temperature of the coated film is 55° to 98° C., especially 70° to 96° C.

In another preferred embodiment of this invention, a water vapor at a high temperature is blown onto the surface of the wet coated film so that the temperature of the film reaches a temperature which is at least 50° C. but below 100° C. and condensation of the water vapor on the surface of the wet coated film does not substantially occur. By the spraying of the water vapor to the surface of the coated film, water is supplied from the surface of the coated film and the coated film is heated to a predetermined temperature within a short period of time by the sensible heat from the vapor having a large heat capacity. As a result, the resin particles on the surface of the coated film flow and the film surface is levelled.

In still another embodiment, the metallic substrate is heated by high frequency induction while the surface of the wet coated film is kept in contact with the water vapor, thereby the temperature of the coated film is maintained at a point which is at least 50° C. In this embodiment, too, water is supplied from the surface of the coated film by contacting the surface of the coated film with the surface of the water vapor. Heating of the coated film is carried out by heating the metallic substrate by high-frequency induction. The high-frequency induction heating is characterized in that it can heat the metal within a very short period of time, for example within 0.1 second. Furthermore, since the coated film is heated from the substrate side, the resin particles are caused to flow while preventing evaporation of water, and levelling of the surface of the coated film can be effected sufficiently.

Examples of the metallic substrate may include surface-treated steel sheets such as tin plate, tin-free steel (TFS), a nickel-plated steel sheet and a nickel/tin-plated steel sheet, metal blanks for making can bodies or closures such as an aluminum plate, and molded articles produced by using these blanks such as drawn and ironed cans, drawn cans, bonded cans, welded cans, can closures and easily-openable closures.

The blanks may be coated by using any known coater such as a roll coater, a bar coater or an air knife coater. The present invention has the marked advantage that even when a roll coater which tends to form ribs on the surface of a coated film from a water-base paint is used, the surface of the resulting coated film can be levelled. Molded articles such as cans and closures may be coated by such means as spray coating or roller coating. There is no particular limitation on the thickness of the coated film. Generally, however, it is suitably 1 to 20 micrometers, especially 2 to 10 micrometers, in the dried and baked state.

The levelling treatment of the wet coated film can be easily effected by introducing the coated article into a zone filled with steam and the coated film is contacted with the steam in accordance with the aforesaid first embodiment. When a water vapor is used for water supply and for heating the coated film, the coated article is fed into a substantially closed treating chamber and the water vapor is filled in the treating chamber. This treatment can be carried out either continuously or batchwise. The temperature of the water vapor is generally 80° to 200° C., especially 100° to 150° C. The steam may be produced outside the treating chamber and then introduced into the treating chamber through a supply line. Alternatively, it may be produced in situ by evaporating water within the treating chamber. Furthermore, when a water vapor is used for water supply and a high-frequency induction coil is used for heating the coated film in accordance with the still other embodiment described above, the high-frequency induction coil is disposed in a passage for conveying the coated article, and a hood is provided so as to cover the conveying passage. Water vapor is fed into the hood so that the surface of the coated film will make contact with the water vapor.

If desired, it is of course possible to employ infrared heating, microwave heating, heating by conduction through the metallic substrate from a heat generator in order to heat the wet coated film.

In any of these cases, the contacting of the coated film with the water vapor in a condition in which water droplets drip from the wet coated film should be avoided.

Drying and baking of the levelled wet film are carried out at a temperature above the temperature at which the emulsified resin particles are formed into a film. The temperature and time used depend also upon the types of the resins and the degree of curing. Generally, it is desirable to select suitable baking conditions from 150° to 250° C. to 2 to 20 minutes.

According to this invention, by dissolving the paint resin and the acrylic resin in an organic solvent or melt-kneading these resins, and applying the phase inversion emulsification method to the solution or melt, an emulsified-type water-base paint having any desired resin composition can be formed by using a small amount of water. In this water-base paint, the resin component is dispersed as fine and uniform particles and also has good dispersion stability. Furthermore, by neutralizing the carboxyl groups in the acrylic resin with at least one amine selected from alkylamines having a branched alkyl group and heterocyclic amines, an emulsion-type water-base paint for cans which has superior adhesion to a metallic substrate and superior film processability can be provided.

Furthermore, according to the coating method of this invention, raised and depressed patterns such as ribs formed on the surface of the wet film at the time of coating the dispersion-type water-base paint can be removed by sufficiently fluidizing the paint particles prior to the drying and baking of the coated film, and the levelness and appearance characteristics of the final coated product can be markedly enhanced.

EXAMPLES

In the examples, all parts are by weight unless otherwise specified. Furthermore, throughout Examples and Comparative Examples, the paints or the coated plates were evaluated by the following procedures except those cases which are otherwise specified.

(1) Stability of the paint with time

One hundred milliliters of an emulsified water-base paint as a sample was put in a 100 ml broad-mouthed glass bottle and tightly stopped. The bottle was stored for 1 month in a constant-temperature vessel at 50° C. Then, the bottle was opened, and the paint was examined. Occurrence of skinning on the surface of the paint was examined, and the viscosity of the water-base paint and the average particle diameter of the resin particles were measured. The results were compared with those obtained before the above storage.

(2) Coatability

The sample emulsified water-base paint was coated on an electrolytically chromate-treated steel plate (to be referred to as TFS) by using a roll coater, and baked at 210° C. for 10 minutes to cure it. The thickness of the coated film was adjusted to about 5 micrometers. The roughness of the surface of the coated plate was measured by a surface roughness tester, and the cycles of the ribs and the difference between the higher and lower ribs were determined. Where the cycles of the ribs were difficult to determine by measurement with the surface roughness meter, the surface condition was evaluated by visual observation.

(3) Preparation of a coated plate and its adhesion and its whitening

The above coated plate was cut to a width of 5 mm. The two cut pieces were bonded by using a nylon-type adhesive and pressing them for 2 minutes with a hot press heated at 200° C. The peel strength of the bonded structure was measured by T peel. The initial-stage peel strength immediately after bonding and the peel strength after immersion in hot water at 90° C. for 1 week were measured. Part of the above coated plate was subjected to retorting treatment at 125° C. for 30 minutes to examine the occurrence of whitening on the coated film by the retorting treatment.

(4) Actual can test

Some of the emulsified water-base paints in the following examples were subjected to an actual can test by the following procedure. The sample water-base paint was coated on one surface of a TFS plate by a roll coater, and baked and dried at 210° C. for 10 minutes. The other surface was coated and baked in the same manner to prepare a TFS plate coated on both surfaces. The thickness of the coated film on each surface was adjusted to about 4 micrometers. By using the coated plate and a nylon-type adhesive, a bonded can of 202 diameter (both end portions were 200 diameter as a result of neck-in processing) was produced. A top closure was attached to the can body by double-seaming. Coffee or consomme soup was filled in the can and a bottom closure was attached to the can body by double seaming. The can was retorted at 120° C. for 90 minutes, cooled and air dried, and then stored in a warehouse. After storage for 6 months, the can was opened, the occurrence of changes such as whitening of the coated film and corrosion on its inside surface were examined.

With some other water-base paints in the following examples, the aforesaid both surface-coated plate was shaped into a can closure of 200 and double-seamed to one end of a bonded can body produced by using a solvent-base paint. After filling an article into the can body, the same closure as above was double-seamed to the other end to produce a can with the article filled in it. The can was then retorted in the same way as above and stored for 6 months. Then, the can was opened, and changes such as whitening of the coated film on the can closure, corrosion of its inside surface and a reduction in adhesion were examined. In this case, the adhesion was tested by bonding a cellophane tape to the surface to be tested, peeling the tape, and evaluated by the area of that part where the coated film was removed from the substrate on peeling.

EXAMPLE 1

Eight hundred parts of a bisphenol A-type epoxy resin having a number average molecular weight of about 3,750 and an epoxy equivalent of about 3,000 was dissolved in 800 parts of butyl Cellosolve. Two hundred parts of a resol-type phenolic resin (bisphenol A-p-cresol=80/20; number average molecular weight 650) derived from bisphenol A, p-cresol and formaldehyde using an ammonia catalyst was dissolved in 400 parts of a mixture of xylene, methyl isobutyl ketone and cyclohexanone (xylene/methyl isobutyl ketone/cyclohexanone=1/1/1). The resulting solution was mixed with the epoxy resin solution above.

Separately, a mixture of 200 parts of ethyl acrylate, 200 parts of methyl methacrylate, 400 parts of methacrylic acid, 200 parts of styrene and 10 parts of tert-butyl hydroperoxide was prepared. A flask equipped with a stirrer, a thermometer, a dropping funnel, a reflux condenser and an inert gas introducing port was charged with 500 parts of ethyl Cellosolve and 260 parts of the above mixture, and with stirring under a nitrogen stream, the temperature was raised to 90° C. The flask was maintained at this temperature, and the remainder of the above monomeric mixture was added dropwise over 3 hours to perform copolymerization. Furthermore, 1 part of tert-butyl hydroperoxide was added, and the mixture was stirred at this temperature for 3 hours, and then 500 parts of ethyl Cellosolve was added. The reaction mixture was cooled and the reaction was terminated. The resulting acrylic resin had a weight average molecular weight of about 120,000 and acid value of 124, and the resin solution had a solids content of 50%.

Then, an aqueous solution of dimethylaminoethanol as a neutralizing agent in 250 parts of deionized water was prepared. Twenty parts of the above acrylic resin solution was added to 160 parts of the above mixed solution of the epoxy resin and the phenolic resin, and they were stirred and mixed uniformly. With vigorous stirring, the aqueous amine solution was gradually added dropwise. The amount of the dimethylaminoethanol added was adjusted to 2 equivalents based on the carboxyl groups in the acrylic resin used (the amount of the amine added in the following was the same unless otherwise indicated). In the early stage of adding the aqueous amine solution, the viscosity of the mixture rose and the mixture became white and creamy. As the addition of the aqueous amine solution proceeded, the viscosity of the mixture gradually decreased. At this stage, the addition of the aqueous amine solution was suspended, and after the mixture was dispersed uniformly in its entirety, the addition of the aqueous amine solution was resumed. The viscosity of the system abruptly decreased. When the dropwise addition of the aqueous amine solution was continued, a stable o/w emulsion was formed after the end of adding all the aqueous amine solution. The emulsion was concentrated by a rotary evaporator, and 100 parts of water and 120 parts of the organic solvent were recovered. An emulsified water-base paint (paint 1) having a solids content of 40% was obtained.

Ten further emulsified-type water-base paints (paints 2 to 11) were prepared in accordance with the same method as the method of producing the paint 1 using the ten amines indicated in Table 1 as the neutralizing agent. The average particle diameters of the resin particles in the resulting emulsified-type water-base paints are also shown in Table 1.

The stability with time of these emulsified-type water-base paints (paints 1 to 11) was examined. No skinning occurred on the liquid surface in any of the water-base paints tested. The viscosities of these emulsified-type water-base paints and the average particle diameters of the resin particles therein after storage did not show any change from those before storage. These paints were also tested for whitening upon retorting and adhesion, and subjected to an actual can test using a consomme soup as can contents. The results are also shown in Table 1.

COMPARATIVE EXAMPLE 1

Two hundred and twenty parts of the mixture of the epoxy resin solution and the phenolic resin solution prepared in Example 1 and 20 parts of the acrylic resin solution prepared in Example 1 were stirred and uniformly mixed, and the mixture was put in a ball mill together with 220 parts of the aqueous amine solution prepared in Example 1. They were treated in the ball mill at room temperature for 24 hours. When the resulting mixture was transferred to a glass vessel and left to stand, it separated into two layers and a stable emulsion did not form.

COMPARATIVE EXAMPLE 2

The adhesion of the mixture (organic solvent-base paint) of the epoxy resin solution and the phenolic resin prepared in Example 1 was evaluated, and the following results were obtained.

Initial peel strength: 5.2 kg/5 mm width
Peel strength after time: 3.8 kg/5 mm width

EXAMPLE 2

A mixture of 15 parts of ethyl acrylate, 15 parts of methyl methacrylate, 40 parts of methacrylic acid, 30 parts of styrene and 1 part of tert-butyl hydroperoxide was prepared, and an acrylic resin was synthesized in accordance with the method shown in Example 1. The resulting acrylic resin had a weight average molecular weight of about 130,000 and an acid value of 124, and the resin solution had a solids content of about 50%. The acrylic resin solution was gradually put in 500 parts of deionized water vigorously stirred, to precipitate solids. The resulting solid acrylic resin was dried in vacuo. Furthermore, 80 parts of the same epoxy resin as used in Example 1, 20 parts of the same resol-type phenolic resin as used in Example 1, 12 parts of hexyl Cellosolve and an aqueous solution of dimethylaminoethanol in 150 parts of deionized water were prepared. In this example, the amount of the amine used as a neutralizing agent was adjusted to one equivalent per equivalent of the carboxyl groups in the acrylic resin.

All the epoxy resin and the phenolic resin above and 10 parts of the solid acrylic resin were added to a kneader kept at 80° C., and mixed. Furthermore, all the hexyl Cellosolve was added and mixed to form a uniform concentrated solution. The aqueous amine solution kept at 80° C. was then added dropwise. By addition of the aqueous amine solution, the mixture became white and creamy, and as the addition of the aqueous amine solution proceeded, the viscosity of the mixture abruptly decreased. When the dropwise addition of the aqueous amine solution was continued, a stable o/w emulsion formed after the dropwise addition of all the aqueous amine solution. The resin particles in the resulting emulsion (paint 12) had an average particle diameter of 0.60 micrometer and the emulsion contained 4.3% of the organic solvent based on the paint.

Ten further emulsified-type water-base paints (paints 13 to 22) were prepared in accordance with the same method as the method of producing the paint 12 using the ten amines indicated in Table 2 as the neutralizing agent. The average particle diameters of the resin particles in the resulting emulsified-type water-base paints are also shown in Table 2.

The stability with time of these emulsified-type water-base paints was examined. No skinning occurred on the liquid surface in any of the water-base paints tested. The viscosities of these emulsified-type water-base paints and the average particle diameters of the resin particles therein after storage did not show any change from those before storage. These paints were also tested for whitening upon retorting and adhesion, and subjected to an actual can test using a coffee drink as can contents. The results are also shown in Table 2.

EXAMPLE 4

Four emulsified-type water-base paints (paints 29 to 32) were prepared in accordance with the method shown in Example 1 using the four curing agent resins indicated in Table 4, the same epoxy resin and acrylic resin as used in Example 1, and sec-butylamine.

Each of these emulsified-type water-base paint was coated on both surfaces of a TFS plate, and shaped into a can closure of 200 diameter. The can closure was evaluated, and the results are shown in Table 4.

EXAMPLE 5

Six emulsified-type water-base paints (paints 33 to 38) were prepared in accordance with the method shown in Example 1 using the same epoxy resin, phenolic resin and acrylic resin as used in Example 1 and morpholine. The epoxy resin and the phenolic resin were added in the proportions shown in Table 5.

Can closures were produced using these six emulsified water-base paints, and evaluated. The results are shown in Table 5.

EXAMPLE 6

Eight emulsified-type water-base paints (paints 39 to 45) were prepared in accordance with the method of Example 1 using the same epoxy resin and phenol resin as used in Example 1, eight acrylic resins having the acid values shown in Table 6 added in the amounts indicated in Table 6, and morpholine.

The stabilities of these emulsified-type water-base paints and the performances of can closures produced by using these paints were evaluated, and the results are shown in Table 6.

EXAMPLE 7

Eight emulsified-type water-base paints (paints 47 to 54) were prepared in accordance with the method of Example 1 using the same epoxy resin and phenol resin as used in Example 1, three acrylic resins having the acid values shown in Table 7 added in the amounts indicated in Table 7, and morpholine.

The stabilities of these emulsified-type water-base paints and the performances of can closures produced by using these paints were evaluated, and the results are shown in Table 7.

EXAMPLE 8

Eight emulsified-type water-base paints (paints 55 to 62) were prepared in accordance with the method of Example 1 using the same epoxy resin and phenol resin as used in Example 1, four acrylic resins having the acid values shown in Table 8 added in the amounts indicated in Table 8, and morpholine.

The stabilities of these emulsified-type water-base paints and the performances of can closures produced by using these paints were evaluated, and the results are shown in Table 8.

EXAMPLE 9

Eighty-five parts of the same epoxy resin as used in Example 1 was dissolved in 80 parts of ethyl Cellosolve. The solution was mixed with a solution of 15 parts of a urea/formaldehyde resin in 15 parts of a mixed solvent of butanol and butyl Cellosolve (butanol/butyl Cellosolve = 1/1). Twenty parts of the same acrylic resin solution as used in Example 1 was added to the mixed solution, and they were stirred and mixed until a uniform solution formed. The solution was converted to an o/w emulsion by the method shown in Example 1 using ammonia as the neutralizing agent. The solvent was eliminated from the emulsion to prepare an emulsified-type water-base paint (paint 63).

The resin particles in this emulsified-type water-base paint had an average particle diameter of about 0.83 micrometers. On storage for one month at 50° C., no sedimentation occurred, nor was there skinning or a marked change in viscosity.

EXAMPLE 10

One hundred parts of a copolymer resin of vinyl chloride, vinyl acetate and vinyl alcohol (Vinylite VMGH produced by Union Carbide Corporation; vinyl chloride/vinyl acetate/vinylalcohol = 91/3/6; degree of polymerization about 500) was dissolved in 200 parts of a mixed solvent of methyl isobutyl ketone and toluene (methyl isobutyl ketone/toluene = 1/1). The solution was mixed with 20 parts of the same acrylic resin solution as used in Example 1 with stirring. The mixed solution was converted to an o/w emulsion by the method shown in Example 1. The solvent was eliminated to give an emulsified-type water-base paint (paint 64).

The resin particles in the emulsified-type water-base paint had an average particle diameter of about 0.75 micrometer. On storage for one month at 50° C., no sedimentation occurred, nor was there skinning or a marked change in viscosity.

EXAMPLE 11

Two hundred and twenty parts of the same mixed solution of the epoxy resin solution and phenolic resin solution as used in Example 1, 10 parts of the same acrylic resin solution as used in Example 1 and 5 parts of oleic acid were uniformly mixed with stirring. From the mixed solution, an o/w emulsion was prepared in accordance with the method shown in Table 1 using isopropylamine as a neutralizing agent. The solvent was eliminated further to give an emulsified-type water-base paint (paint 65).

The resin particles in the emulsified-type water-base paint had an average particle diameter of about 0.55 micrometer. On storage for one month at 50° C., no sedimentation occurred, nor was there skinning or a marked change in viscosity.

EXAMPLE 12

A mixture of the same epoxy resin solution, phenolic resin solution and acrylic resin solution as used in Example 1 was concentrated at 80° C. by using a rotary evaporator to give solutions having a solids content of 60%, 70% and 80%, respectively. Furthermore, ethyl Cellosolve was added to a mixture of the same epoxy resin solution, phenolic resin solution and acrylic resin solution as used in Example 1 to dilute it and thus prepare solutions having a solids content of 10%, 20% and 30%, respectively. These solutions were converted to o/w emulsions in accordance with the method shown in Example 1 using morpholine as the neutralizing agent. The solvent was eliminated to give emulsified-type water-base paints (paints 66 to 71).

The resin particles in the emulsified-type water-base paint prepared from the solution having a solids concentration of 80% had an average particle diameter of as large as 3.05 micrometers, and on storage for one month at 50° C., some of the resin particles tended to sediment. But in the other emulsified-type water-base paints have a sufficiently small average particle diameter, and on storage for one month at 50° C., no sedimentation occurred, nor was there skinning or a marked change in viscosity.

EXAMPLE 13

Six paint resin solutions were prepared by mixing 220 parts of a mixture of the same epoxy resin solution and phenolic resin as used in Example 1 and each of the amounts indicated in Table 9 of the same acrylic resin solution as prepared in Example 1 with stirring.

Aqueous solution of morpholine in deionized water was prepared, and using the aqueous amine solution, these solutions were converted into o/w emulsions in accordance with the method shown in Example 1. The solvent was eliminated to prepare six emulsified-type water-base paints (paints 72 to 77). Table 9 also shows the average particle diameters of the resin particles in the resulting emulsified-type water-base paints. The performances of the emulsified-type water-base paints were evaluated in accordance with the method shown in Example 1, and the results are shown in Table 9.

EXAMPLE 14

Eighty parts of the same epoxy resin as used in Example 1, 20 parts of the same phenolic resin as used in Example 1, the same acrylic resin as used in Example 2 in each of the amounts indicated in Table 10, and 12 parts of hexyl Cellosolve were put in a kneader kept at 80° C., and mixed to prepare six concentrated solutions of paint resins.

Using a solution of morpholine in deionized water, these solutions were converted into o/w emulsions by the method shown in Example 2 to prepare six emulsified-type water-base paints (paints 78 to 83). Table 10 also shows the average particle diameters of the resin particles in the emulsified-type water-base paints. The performances of the resulting emulsified-type water-base paints were evaluated in accordance with the method shown in Example 2, and the results are shown in Table 10.

EXAMPLE 15

Each of paint 1 in Example 1 and paint 12 in Example 2 was coated on a tin plate having a thickness of 0.23 mm using a roll coater. Immediately after coating, steam derived from a steam kettle kept at 130° C. was blown against the coated surface for 5 seconds. The temperature of the wet film, measured by an infrared radiation temperature, reached 56° C. Thereafter, the coated plate was dried by holding it in a hot air-type dryer kept at 200° C. for 10 minutes to cure the coated film. After drying, the coated film had a thickness of about 5 micrometers on an average.

An attempt was made to measure the roughness of the coated surfaces of the resulting coated tin plates by using a surface roughness tester. But no roughness which appeared to be ribs was measured. By visual evaluation, the coated surfaces were as smooth as a surface coated with an ordinary solvent-base paint, and presented no problem in appearance.

COMPARATIVE EXAMPLE 3

The same paints as used in Example 15 were each coated on a tin plate in the same way as in Example 15. The coated plate, without blowing steam, was dried by holding it in a hot air-type dryer kept at 200° C. for 10 minutes to cure the coated film. After drying, the coated film had a thickness of about 5 micrometers on an average.

The roughness of the coated surface of the coated plate was measured by a surface roughness tester. With any of these paints, 17 ribs were formed per cm, and the difference between higher and lower ribs was about 1.5 micrometers. By visual evaluation, ribs formed markedly, and the coated plate presented a poor appearance.

EXAMPLE 16

The same water-base paint (paint 1) as used in Example 15 was coated on a tin plate in the same way as in Example 15. Immediately after coating, the coated surface was brought into contact for two seconds with steam emitted from a kettle holding boiling water. The temperature of the wet film, measured by an infrared radiation thermometer, reached 63° C. The coated plate was then dried by maintaining it for 10 minutes in a hot air-type dryer kept at 200° C. to cure the coated film. After drying, the coated film had a thickness of about 5 micrometers on an average.

The roughness of the coated surface of the coated plate was measured by a surface roughness tester. Fifteen ribs formed per cm, and the difference between higher and lower ribs was about 0.3 micrometer. By visual evaluation, the coated surface was comparatively smooth, and did not present any significant problem in appearance.

EXAMPLE 17

On the side of an exit of a roll coater from which the coated plate would leave, a pipe was provided so as to blow steam in a shower form against the coated surface. The same water-base paint (paint 12) as used in Example 15 was coated on a tin plate while steam derived from a steam kettle kept at 130° C. was blown against the coated surface via the pipe. The temperature of the wet coated film, measured by an infrared radiation thermometer, reached 51° C. Then, the coated plate was dried by maintaining it for 10 minutes in a hot air-type dryer kept at 200° C. to cure the coated film. After drying, the coated film had a thickness of about 7 micrometers on an average.

An attempt was made to measure the roughness of the coated surfaces of the resulting coated tin plates by using a surface roughness tester. But no roughness which appeared to be ribs was measured. By visual evaluation, the coated surfaces were as smooth as a surface coated with an ordinary solvent-base paint, and presented no problem in appearance.

EXAMPLE 18

Fifty parts of the same water-based paint (paint 1) as used in Example 15 and 50 parts of a water-soluble paint prepared by dissolving an acrylic resin in an aqueous amine solution to prepare a water-base paint. This water-base paint had a solids content of about 40% and an organic solvent content of about 2%.

A box having a steam introducing port in the lower part and a closable opening for taking out a coated plate in the lower part was provided on the side of an exit of a roll coater. Steam derived from a steam kettle kept at 125° C. was introduced into the box from the steam introducing port, and the atmosphere in the box was adjusted to a temperature of 80° C. and a relative humidity of more than 95%. Then, the water-base paint in steam form was coated on a TFS plate having a thickness of 0.22 mm, and immediately after coating, the coated plate was introduced into the box. Within the box, steam was blown into the non-coated surface of the coated plate. The plate was kept in the box for 4 seconds, and taken out from the box when the coated film attained a temperature of 65° C. It was then dried by holding it for 10 minutes in a hot air-type dryer kept at 200° C. to cure the coated film. After drying, the coated film had a thickness of about 5 micrometers.

The roughness of the coated surface of the coated plate was measured by a surface roughness tester. Eleven ribs formed per cm, and the difference between higher and lower ribs was about 0.3 micrometer. By visual evaluation, the coated surface was a smooth as a surface coated with an ordinary solvent-base paint, and did not present any significant problem in appearance.

EXAMPLE 19

A solution of a urea resin was added to a solution of an epoxy-acrylate resin obtained by esterification of an epoxy resin and an acrylic resin, and with stirring, aqueous ammonia was added to the mixture to prepare an o/w emulsion. The solvent was eliminated to obtain a water-base paint. The resin particles in this water-base paint had an average particle diameter of 0.22 micrometer, and the paint had a solids content of 40% and an organic solvent content of 3%.

A box having a high-frequency induction heating coil in the lower part and a closable opening for taking out a coated plate in the upper part was set up on the side of an exit of a roll coater. Steam derived from a steam kettle kept at 125° C. was introduced into the box to adjust the atmosphere in the box at a temperature of 40° C. and a relative humidity of more than 95%. Then, the above paint was coated on a TFS plate having a thickness of 0.22 mm. Immediately after coating, the coated plate was introduced into the box and the substrate plate was heated by high-frequency induction heating. The heating time was set at 0.5 second. The temperature attained was adjusted by controlling the voltage of a power supply. Table 11 shows the temperature attained at this time. After the high-frequency induction heating, the coated plate was immediately taken out, and dried by holding it for 10 minutes in a hot air-type dryer kept at 200° C. to cure the coated film. After drying, the thickness of the coated film was about 8 micrometers on an average.

The roughness of the coated surface of the coated plate was measured by a surface roughness tester. The results are shown in Table 11 together with the results obtained from visual evaluation.

diately then taken out from the box. The coated plate was dried by holding it for 10 minutes in a hot air-type dryer kept at 200° C. to cure the coated film. After drying, the thickness of the coated film was about 10 micrometers on an average. The set temperature of the hot plate and the temperature of the coated film at the time of taking out are shown in Table 12.

The roughness of the coated surface of the coated plate was measured by a surface roughness tester. The results are shown in Table 12 together with the results obtained from visual evaluation.

TABLE 1

| Paint No. | Neutralizing agent | Average particle diameter of the resin particles (μm) | Initial Peel Strength (Kg/5 mm) | Peel Strength With time (Kg/5 mm) | Whitening on retorting | Actual can test |
|---|---|---|---|---|---|---|
| 1 | dimethylaminoethanol | 0.60 | 6.9 | 3.9 | none | Tendency to reduced adhesion, pitting corrosion in the processed part |
| 2 | ammonia | 0.78 | 6.9 | 3.8 | none | Tendency to reduced adhesion, pitting corrosion in the processed part |
| 3 | isopropylamine | 0.57 | 7.0 | 4.8 | none | no change |
| 4 | sec-butylamine | 0.63 | 6.8 | 4.5 | none | no change |
| 5 | tert-butylamine | 0.82 | 6.9 | 4.7 | none | no change |
| 6 | isoamylamine | 0.55 | 7.1 | 4.7 | none | no change |
| 7 | morpholine | 0.65 | 7.1 | 4.6 | none | no change |
| 8 | phrrolidine | 0.76 | 7.2 | 4.8 | none | no change |
| 9 | n-propylamine | 0.69 | 6.8 | 2.5 | none | Tendency to reduced adhesion, corrosion below the coated film |
| 10 | n-butylamine | 0.84 | 6.8 | 3.1 | none | Tendency to reduced adhesion, pitting corrosion in the processed part |
| 11 | triethylamine | 0.72 | 7.1 | 2.4 | none | Tendency to reduced adhesion, corrosion below the coated film |

TABLE 2

| Paint No. | Neutralizing agent | Average particle diameter of the resin particles (μm) | Initial Peel Strength (Kg/5 mm) | Peel Strength With time (Kg/5 mm) | Whitening on retorting | Actual can test |
|---|---|---|---|---|---|---|
| 12 | dimethylaminoethanol | 0.83 | 6.9 | 3.9 | none | Tendency to reduced adhesion, pitting corrosion at the processed part |
| 13 | ammonic | 0.78 | 6.9 | 3.8 | none | Tendency to reduced adhesion, pitting corrosion at the processed part |
| 14 | isopropylamine | 0.85 | 7.1 | 4.5 | none | no change |
| 15 | sec-butylamine | 0.91 | 7.0 | 4.7 | none | no change |
| 16 | tert-butylamine | 0.78 | 7.1 | 4.7 | none | no change |
| 17 | isoamylamine | 0.69 | 6.7 | 4.9 | none | no change |
| 18 | morpholine | 0.83 | 6.9 | 4.6 | none | no change |
| 19 | phrrolidine | 0.89 | 7.0 | 4.8 | none | no change |
| 20 | n-propylamine | 0.88 | 6.6 | 2.2 | none | Tendency to reduced adhesion, corrosion below the coated film |
| 21 | n-butylamine | 0.85 | 7.1 | 2.6 | none | Tendency to reduced adhesion, pitting corrosion at the processed part |
| 22 | diethylamine | 0.92 | 6.7 | 2.0 | none | Tendency to reduced adhesion, pitting corrosion at the processed part |

EXAMPLE 20

A box having a hot plate in the lower part and a closable opening for taking out a coated plate in the upper part was set up on the side of an exit of a roll coater. Steam derived from a steam kettle kept at 125° C. was introduced into the box to adjust the atmosphere in the box to a temperature of 60° C. and a relative humidity of 90%. The same water-base paint (paint 1) as used in Example 15 was coated on a TFS plate having a thickness of 0.22 mm. Immediately after coating, the coated plate was introduced into the box, placed on the hot plate, and left to stand on it for 2 seconds, and imme-

TABLE 4

| Paint No. | Curing agent resin | Evaluation with the can closure |
|---|---|---|
| 29 | resol-type phenolic resin, molecular weight about 300 | no change |
| 30 | resol-type phenolic resin, molecular weight about 1,000 | no change |
| 31 | urea resin | no change |

TABLE 4-continued

| Paint No. | Curing agent resin | Evaluation with the can closure |
|---|---|---|
| 32 | melamine resin | slightly whitened |

TABLE 5

| Paint No. | Epoxy resin/ phenolic resin | Evaluation with the can closure |
|---|---|---|
| 33 | 98/2 | the paint on the inside surface of can was slightly whitened |
| 34 | 95/5 | no change |
| 35 | 75/25 | no change |
| 36 | 55/45 | no change |
| 37 | 40/60 | no change |
| 38 | 30/70 | pitting corrosion occurred in the processed part on the inside surface of the can |

TABLE 7

| Paint No. | Acid value of the acrylic resin | Amount Added (%) | Acid value based on the paint resin | Evaluation with the can closure |
|---|---|---|---|---|
| 47 | 300 | 2 | 6 | Pitting corrosion at the unevenly coated part |
| 48 | 300 | 3 | 9 | no change |
| 49 | 300 | 5 | 15 | no change |
| 50 | 100 | 10 | 10 | no change |
| 51 | 100 | 20 | 20 | no change |
| 52 | 100 | 30 | 30 | The coated film on the inside surface of the closure was slightly whitened |
| 53 | 80 | 25 | 19 | no change |
| 54 | 80 | 35 | 27 | Pitting corrosion in the unevenly coated part |

TABLE 8

| Paint No. | Acid value of the acrylic resin | Amount Added (%) | Acid value based on the paint resin | Stability of the paint | Evaluation with the can closure |
|---|---|---|---|---|---|
| 55 | 60 | 3 | 1.8 | Tendency to Sedimentation | Pitting corrosion in the unevenly coated part |
| 56 | 70 | 3 | 2.1 | good | no change |
| 57 | 100 | 3 | 3.0 | good | no change |
| 58 | 100 | 5 | 5.0 | good | no change |
| 59 | 200 | 4.5 | 9.0 | good | no change |
| 60 | 200 | 10 | 20.0 | good | no change |
| 61 | 200 | 15 | 30.0 | good | no change |
| 62 | 200 | 17 | 34.0 | Tendency to Sedimentation | Pitting corrosion in the unevenly coated part |

TABLE 6

| Paint No. | Acid value of the acrylic resin | Amount Added (%) | Acid value based on the paint resin | Stability of the paint | Evaluation with the can closure |
|---|---|---|---|---|---|
| 39 | 20 | 28 | 5.6 | Tendency to Sedimentation | Pitting corrosion at the unevenly coated part |
| 40 | 35 | 22 | 7.7 | good | no change |
| 41 | 70 | 12 | 8.4 | good | no change |
| 42 | 150 | 7 | 10.5 | good | no change |
| 43 | 250 | 6 | 15.0 | good | no change |
| 44 | 330 | 5 | 16.5 | good | no change |
| 45 | 350 | 5 | 17.5 | good | no change |
| 46 | 400 | 5 | 20.0 | Tendency to Sedimentation | Pitting corrosion at the unevenly coated part |

TABLE 9

| Emulsified-type water-base paint | Amount of the acrylic resin solution added (parts) | Average particle diameter of the resin particles (μm) | Initial peel strength (Kg/5 mm) | Peel strength with time (Kg/5 mm) | Whitening on retorting | Corrosion at the inside surface of the can | Coatability on a roll coater | Sedimentation of the resin particles |
|---|---|---|---|---|---|---|---|---|
| 72 | 3 | 2.76 | 7.3 | 4.8 | none | pitting corrosion | coating difficult | partly sedimented |
| 73 | 5 | 0.92 | 7.2 | 4.9 | none | none | no problem | not sedimented |
| 74 | 10 | 0.74 | 7.0 | 5.1 | none | none | no problem | not sedimented |
| 75 | 20 | 0.61 | 7.1 | 5.0 | none | none | no problem | not sedimented |
| 76 | 50 | 0.22 | 6.9 | 4.5 | none | none | no problem | not sedimented |
| 77 | 60 | 0.20 | 7.0 | 3.6 | occurred | none | no problem | not sedimented |

TABLE 10

| Emulsified-type water-base paint | Amount of the acrylic resin solution added (parts) | Average particle diameter of the resin particles (μm) | Initial peel strength (Kg/5 mm) | Peel strength with time (Kg/5 mm) | Whitening on retorting | Corrosion at the inside surface of the can | Coatability on a roll coater | Sedimentation of the resin particles |
| --- | --- | --- | --- | --- | --- | --- | --- | --- |
| 78 | 1.5 | 2.56 | 7.1 | 4.9 | none | pitting corrosion | coating difficalt | Partly sedimented |
| 79 | 2.5 | 0.88 | 7.0 | 4.7 | none | none | no problem | not sedimented |
| 80 | 5 | 0.73 | 6.8 | 5.0 | none | none | no problem | not sedimented |
| 81 | 10 | 0.55 | 7.3 | 5.1 | none | none | no problem | not sedimented |
| 82 | 25 | 0.21 | 7.1 | 4.6 | none | none | no problem | not sedimented |
| 83 | 30 | 0.20 | 7.2 | 3.4 | occurred | none | no problem | not sedimented |

TABLE 11

| Condition | Temperatures of the coated film (°C.) | Number of ribs formed (per cm) | Difference between high and low ribs (μm) | Appearance of the coated surface by visual evaluation |
| --- | --- | --- | --- | --- |
| 1 | 40 | 16 | 0.7 | slightly many ribs, but the appearance acceptable |
| 2 | 50 | 17 | 0.4 | slight trace of ribs |
| 3 | 70 | 18 | 0.3 | good |
| 4 | 90 | — | measuring impossible | good |
| 5 | 98 | — | measuring impossible | good |
| 6 | 105 | — | measuring impossible | forming occurred in the coated film |

TABLE 12

| Condition | Preset temperature of the hot plate (°C.) | Temperature (°C.) of the coated film | Number of ribs (per cm) | Difference between high and low ribs (μm) | Appearance of the coated surface by visual evaluation |
| --- | --- | --- | --- | --- | --- |
| 7 | 100 | 55 | 15 | 0.4 | good |
| 8 | 120 | 63 | 13 | 0.3 | good |
| 9 | 150 | 87 | — | measuring impossible | good |
| 10 | 180 | 96 | — | measuring impossible | good |

We claim:

1. An emulsified-type water-base paint which comprises a film-forming thermosetting composition comprising (a) an epoxy resin component, (b) a curing agent resin component for the epoxy resin component and (c) a carboxyl group-containing acrylic resin as a polymeric dispersing agent where the carboxyl groups in the acrylic resin are present so that the acid value is 2 to 30 based on the paint resin composition, wherein said paint is an oil-in-water emulsion which is obtained by mixing (i) an organic solvent solution or molten composition comprising (a) the epoxy resin, (b) the curing agent resin and (c) the carboxyl group-containing acrylic resin with (ii) water containing ammonia or an amine to convert the carboxyl groups in the acrylic resin to an ammonium or amine salt and to cause a phase inversion of the film-forming composition and the acrylic resin from the continuous phase to a dispersed particle phase where the film-forming composition and the acrylic resin are in a blended or mutually dissolved state.

2. The water-base paint set forth in claim 1 in which the epoxy resin component is a bisphenol A-type epoxy resin having an epoxy equivalent of 400 to 20,000 and a number average molecular weight of 1,000 to 20,000.

3. The water-base paint set forth in claim 1 in which the curing agent resin component is a resol-type phenolic resin or an amino resin.

4. The water-base paint set forth in claim 1 in which the weight ratio of the epoxy resin to the curing agent resin is from 95:5 to 40:60.

5. The water-base paint set forth in claim 1 in which the acrylic resin has an acid value in the range of 35 to 350 and is present in an amount of 3 to 30% by weight based on the thermosetting resin.

6. A water-base paint for cans which comprises a film-forming thermosetting composition comprising (a) an epoxy resin component, (b) a curing agent resin component for the epoxy resin component and (c) a carboxyl group-containing acrylic resin as a polymer dispersing agent where the carboxyl groups in the acrylic resin are present so that the acid value is 2 to 30 based on the paint resin composition, wherein said paint is an oil-in-water emulsion which is obtained by mixing (i) an organic solvent solution or molten composition comprising (a) the epoxy resin, (b) the curing agent resin and (c) the carboxyl group-containing resin with (ii) water containing at least one amine selected from the group consisting of alkylamines having a branched alkyl group and heterocyclic amines to convert the carboxyl groups in the acrylic resin to an amine salt and to cause the phase inversion of the film-forming composition and the acrylic resin from the continuous phase to a dispersed particle phase where the film-forming composition and the acrylic resin are in a blended or mutually dissolved state.

7. The water-base paint for cans set forth in claim 6 in which the epoxy resin component is a bisphenol A-type epoxy resin having an epoxy equivalent of 400 to 20,000 and a number average molecular weight of 1,000 to 20,000.

8. The water-base paint for cans set forth in claim 6 in which the curing agent resin component is a resol-type phenolic resin or an amino resin.

9. The water-base paint for cans set forth in claim 6 in which the weight ratio of the epoxy resin to the curing agent resin is from 95:5 to 40:60.

10. The water-base paint for cans set forth in claim 6 in which the acrylic resin has an acid value in the range of 35 to 350 and is present in an amount of 3 to 30% by weight based on the thermosetting resin.

11. A process for producing an emulsified-type water-base paint, which comprises preparing an organic solvent solution containing a paint resin and 3 to 30% by weight, based on the paint resin, of an acrylic resin having an acid value of 35 to 350, mixing the solution with ammonia or an amine and water to convert the carboxyl groups in the acrylic resin to an ammonium or amine salt, and allowing the resin component in the solution to self-emulsify to an o/w-type emulsion.

12. The process set forth in claim 11 in which the paint resin contains an epoxy resin and a curing agent resin for the epoxy resin in a weight ratio of from 95:5 to 40:60.

13. A process for producing an emulsified-type water-base paint, which comprises melting a composition containing a paint resin and 3 to 30% by weight, based on the paint resin, of an acrylic resin having an acid value of 35 to 350 and optionally an organic solvent, mixing ammonia or an amine and water with the molten composition, kneading the mixture to convert the carboxyl groups in the acrylic resin to an ammonium or amine salt, and allowing the resin component to self-emulsify to an o/w-type emulsion.

14. A method of coating with a water-base paint, which comprises coating a water-base paint containing emulsified resin particles on the surface of a metallic substrate, and prior to drying or baking of the resulting wet coated film, contacting the surface of the wet coated film with a water vapor or a water vapor containing condensed fine water droplets to fluidize the resin particles on the surface of the wet coated film and to level the surface of the coated film.

15. The method set forth in claim 14 in which during contact with the water vapor, the wet film is maintained at a temperature of at least 50° C. but lower than 100° C.

16. The method set forth in claim 14 in which the water vapor at a high temperature is blown against the surface of the wet coated film so that temperature of the coated film reaches a temperature of at least 50° C. but lower than 100° C.

17. The method set forth in claim 14 in which while the surface of the wet coated film is kept in contact with the water vapor, the metallic substrate is heated by high-frequency induction, thereby maintaining the temperature of the coated film at 50° C. or higher but below 100° C.

* * * * *